(12) United States Patent
Boyd

(10) Patent No.: US 6,676,146 B2
(45) Date of Patent: Jan. 13, 2004

(54) WHEELED DEVICE FOR PEDAL-POWERED RIDING

(76) Inventor: Donald Boyd, P.O. Box 5422, Kailua-Kona, HI (US) 96745

( * ) Notice: Subject to any disclaimer, the term of this patent is extended or adjusted under 35 U.S.C. 154(b) by 0 days.

(21) Appl. No.: 10/120,342

(22) Filed: Apr. 11, 2002

(65) Prior Publication Data

US 2003/0193157 A1 Oct. 16, 2003

(51) Int. Cl.⁷ ................................................. B62M 1/02
(52) U.S. Cl. ........................................ 280/205; 280/221
(58) Field of Search ................................ 280/205, 221, 280/62

(56) References Cited

U.S. PATENT DOCUMENTS

| | | | | |
|---|---|---|---|---|
| 3,107,926 A | * | 10/1963 | Verge | 280/221 |
| D216,817 S | * | 3/1970 | Purdy | D21/663 |
| 5,011,171 A | * | 4/1991 | Cook | 280/221 |
| 5,129,664 A | * | 7/1992 | Chen | 280/221 |
| 5,326,118 A | * | 7/1994 | DeRosa | 280/205 |
| 5,421,794 A | * | 6/1995 | Du | 482/57 |
| 5,997,019 A | * | 12/1999 | Hoerz | 280/209 |

* cited by examiner

Primary Examiner—Kevin Hurley
(74) Attorney, Agent, or Firm—Hovey Williams LLP

(57) ABSTRACT

A three-wheeled device (10) for pedal-powered riding, wherein the device (10) provides a substantial but not excessive riding challenge. The preferred device (10) broadly comprises three wheels (12); two shafts (14); and two pedals (16). The wheels (12) are oriented parallel to one another so as to rotate about a common axis. Each shaft extends between and couples (14) two of the wheels (12) in an offset manner. Bearings (26) may be provided to facilitate movement of the shafts relative to the wheels (12) by reducing friction therebetween. Each pedal (16) is coupled with a different one of the shafts (14). For added safety, the pedals (16) may include non-slip contact surfaces (30) and light reflectors (32). In use, a rider stands on the pedals (16) and applies force thereto, with the force being transferred via the shafts (14) to the wheels (12) which are thereby caused to roll.

6 Claims, 4 Drawing Sheets

WHEELED DEVICE FOR PEDAL-POWERED RIDING

BACKGROUND OF THE INVENTION

1. Field of the Invention

The present invention relates broadly to wheeled devices for pedal-powered riding. More particularly, the present invention concerns a device comprising a center wheel and two side wheels spaced apart from and oriented parallel to one another so as to have a common axis of rotation; two shafts, with each shaft extending between and coupled with the center wheel and a different one of the side wheels in an offset manner; and two pedals associated with the shafts, wherein a rider stands upon the pedals and applies force thereto to cause the wheels to move.

2. Description of the Prior Art

It is often desirable to ride a device which requires substantial motor skills such as balance or coordination. This is particularly true, for example, for children or young adults who relish the challenge of mastering such a device. It is also true, however, for those persons, possibly disabled, injured, or otherwise handicapped, who lack and wish to develop these motor skills through a rehabilitation or therapy regimen involving riding such a device.

For these reasons, a variety of such devices exist in the prior art. One-wheeled pedal-powered unicycles exist, for example, which require a very high level of balance and coordination to ride. Unicycles do not enjoy great popularity, however, in part because the rider must be concerned with maintaining balance in all four directions, including forward and backward and side-to-side, thereby making the unicycle exceedingly difficult to ride. Two-wheeled pedal-powered bicycles exist which require substantially less skill than the aforementioned unicycle and therefore enjoy greater use and popularity. Bicycles, however, are generally built to provide a practical means of transportation and are therefore relatively large and heavy, having a full frame, seat, and handle bars, and are correspondingly costly to manufacture. Thus, bicycles are not suitable for use in most indoor settings, are not easily or conveniently hand-transportable, and are relatively costly to purchase and maintain, making them generally undesirable and unfriendly to users outside of the context of practical transportation for which they were designed. Three-wheeled pedal-powered tricycles exist which require very little skill to ride, with the wheels being traditionally provided in a stable tripod-type arrangement. It will be appreciated, however, that such conventional tricycles present little or no riding challenge and do not require or aid in developing significant balance or coordination skills. Similarly, conventional four-wheeled pedal-powered devices are also very stable and therefore provide none of the riding challenge or rehabilitative or therapeutic potential of a less stable device.

Thus, there exists a need for an improved wheeled device for pedal-powered riding which presents a substantial but not excessive riding challenge, which requires or aids in developing motor skills such as balance and coordination, and which is more generally usable and user-friendly.

SUMMARY OF THE INVENTION

The present invention overcomes the above-described and other disadvantages in the prior art by providing a three-wheeled device for pedal-powered riding, wherein the device provides a substantial and enjoyable but not excessive riding challenge. In a preferred embodiment, the device broadly comprises three wheels, including a center wheel and left and right side wheels; two shafts, including a first shaft and a second shaft; and two pedals, including a first pedal and a second pedal.

The wheels support the remainder of the device and a rider in a suspended operating position while facilitating straight or turning movements along a substantially forward or backward line of travel and inhibiting direct sideward movement. Thus, the device is more stable and easier to ride than a unicycle, but less stable and more challenging to ride than a traditional tricycle. The wheels are substantially identical in construction and are spaced apart from and oriented parallel to one another so as to rotate about a common axis. Each wheel includes a center portion and a circumferential portion. The center portions provide structural support and stability to the wheels and facilitate coupling the wheels with the shafts. Each center portion includes one or more mounting holes which receive and engage an end of one of the shafts. The center wheel includes two such mounting holes, with each being identically offset to opposite sides of the wheels' common axis of rotation. The left and right side wheels each include at least one mounting hole which aligns with a different one of the center wheel's two mounting holes. The mounting holes may be provided with bearings for receiving the shafts and for facilitating the turning thereof relative to the wheels by reducing contact friction forces. The circumferential portion of each wheel provides protection against wear, reduces marring and noise associated with riding the device, and aids in absorbing impacts.

The shafts extend between and couple the wheels and allow for transferring a rider-applied force from the pedals to the wheels. The ends of each shaft are preferably adapted in a conventional manner for engaging or otherwise coupling with the mounting holes in the wheels or with the bearings provided in the mounting holes. When so coupled, the first shaft will be parallel to and offset in a first direction from the wheels' axis of rotation, and the second shaft will be parallel to and offset in a second direction from the wheels' axis of rotation, wherein the second direction is opposite the first.

The pedals support the rider and are acted upon by the rider to cause the device to move. The first pedal is coupled with the first shaft and the second pedal is coupled with the second shaft, and each pedal is substantially rectangular in shape and dimensioned to accommodated one of the rider's feet. For added safety, the pedals may include one or more non-slip contact surfaces and one or more light reflectors. The non-slip contact surfaces reduce or substantially eliminate slippage of the rider's feet from the pedals. The light reflectors reflect ambient light, such as, for example, light from nearby streetlights or vehicle headlights, during nighttime or other low-visibility riding.

In use, the rider stands on the pedals and applies force thereto, with the force being transferred via the shafts to the wheels which are thereby caused to roll.

Thus, it will be appreciated that the wheeled device of the present invention provides a number of significant advantages over the prior art, including, for example, that the device provides a substantial and enjoyable but not excessive riding challenge which requires and aids in developing motor skills such as balance and coordination. Furthermore, the device is advantageously suitable for indoor use, is conveniently hand-transportable, and is substantially less complex in construction and therefore less costly to manufacture. For these reasons, the device has application, for example, as a child's toy or a young adult's recreational vehicle wherein the child or young adult desires the challenge of mastering the device, or as part of a rehabilitation or therapy regimen for disabled, injured, or otherwise handicapped persons who wish to develop or regain such the motor skills. Thus, the device incorporates features making it particularly suited for and user-friendly in a variety of applications and contexts of use.

These and other important aspects of the present invention are more fully described in the section entitled DETAILED DESCRIPTION, below.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENT

Figure 1:
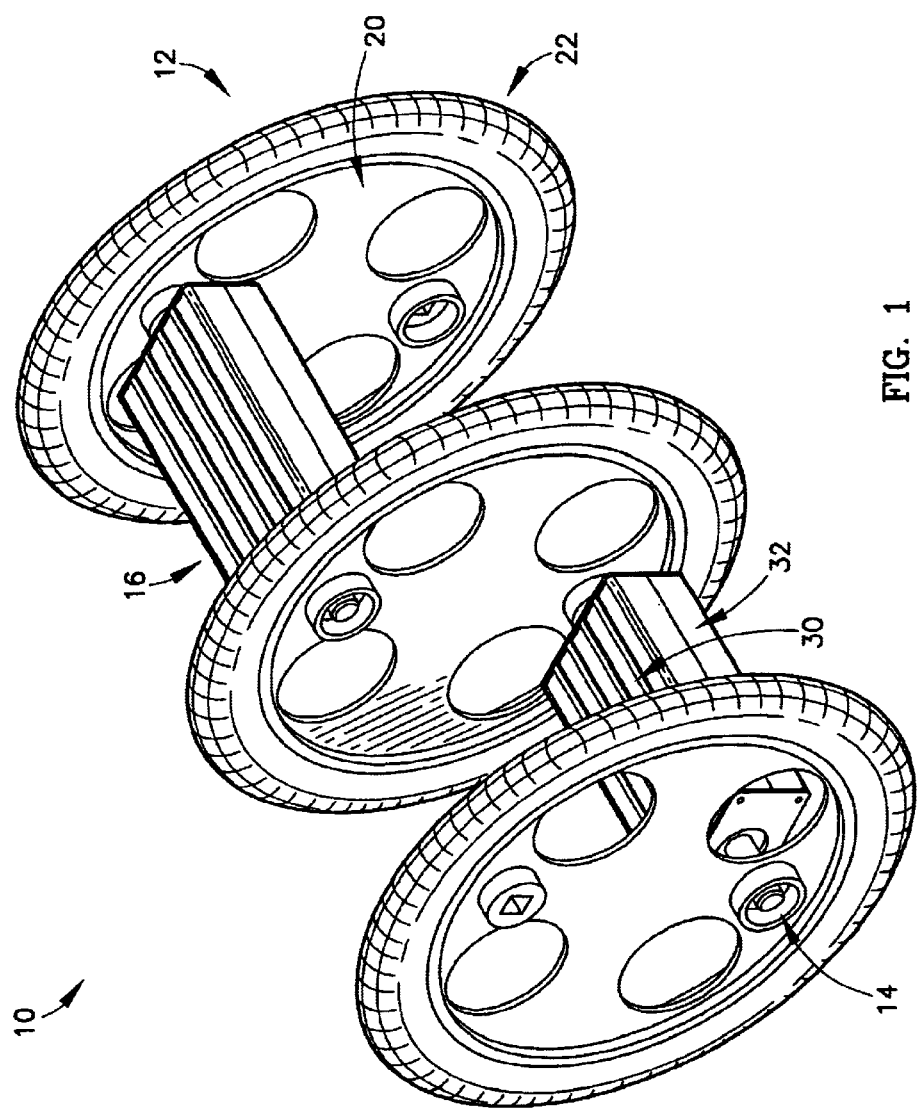
FIG. 1 is an isometric view of a preferred first embodiment of the wheeled device of the present invention.
Figure 2:
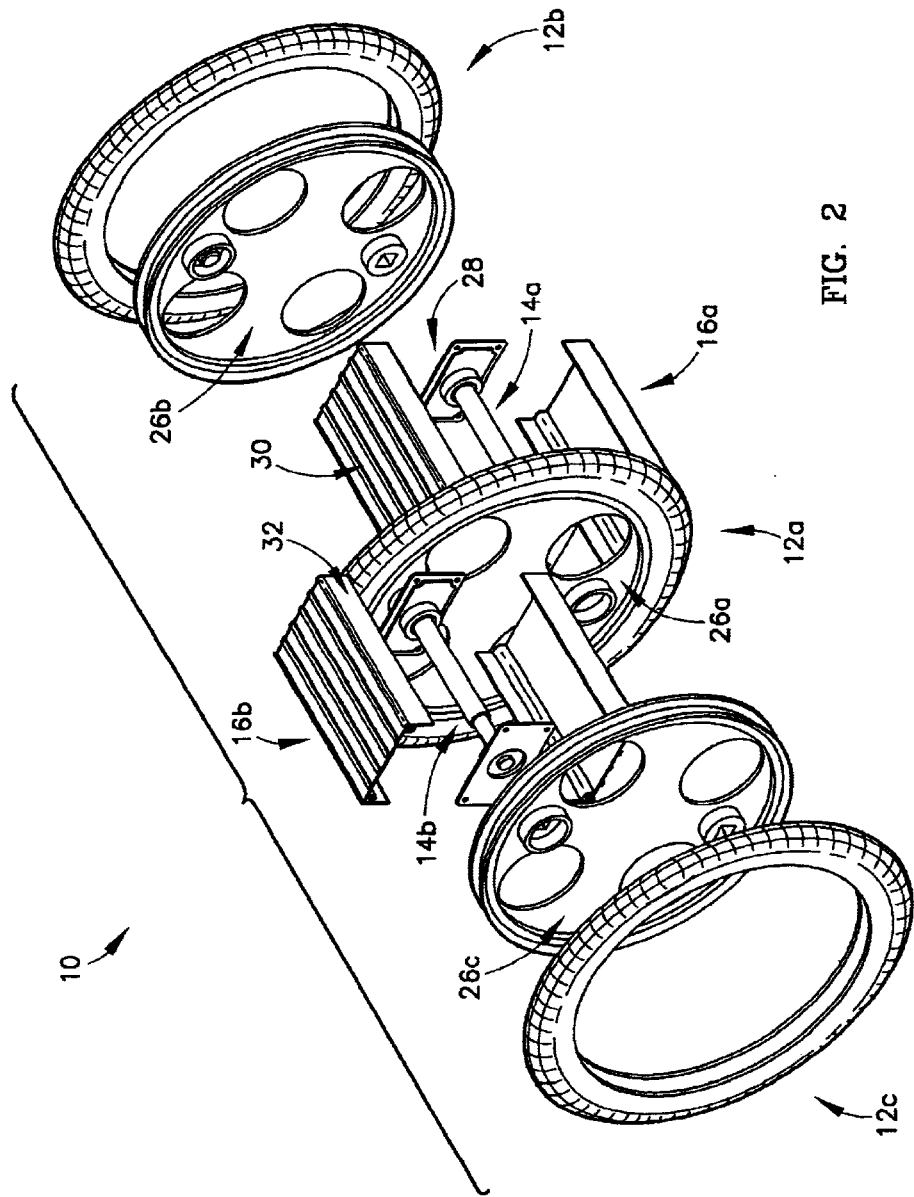
FIG. 2 is an exploded isometric view of the device of FIG. 1.

Referring to FIGS. 1 and 2, a wheeled device 10 for pedal-powered riding is shown constructed in accordance with a preferred first embodiment of the present invention. The device 10 provides a substantial and enjoyable but not excessive riding challenge, and may be used in any application requiring or facilitating the development of motor skills such as balance or coordination. Such applications may include, for example, use as a toy or recreational device for children or young adults or as part of a rehabilitation or therapy regimen for disabled, injured, or otherwise handicapped persons.

In the preferred first embodiment, the device 10 broadly comprises three wheels 12; two shafts 14; and two pedals 16. The wheels 12 support the remainder of the device 10 and a rider in a suspended operating position while facilitating straight or turning movements along a substantially forward or backward line of travel and inhibiting direct sideward movement. Thus, the device 10 is less challenging to ride than a unicycle, but more challenging to ride than a traditional tricycle. As illustrated, there are preferably three wheels 12, including a center wheel 12a, a left side wheel 12b, and a right side wheel 12c, though additional wheels may be added, such as, for example, to allow for multiple simultaneous riders. The wheels 12 are spaced apart from and oriented parallel to one another so as to rotate about a common axis. The wheels 12 may be substantially identical in construction and of any practical diameter, width, or other dimensions, with such dimensions potentially depending heavily on the size and weight of the rider to be supported.

Figure 3:
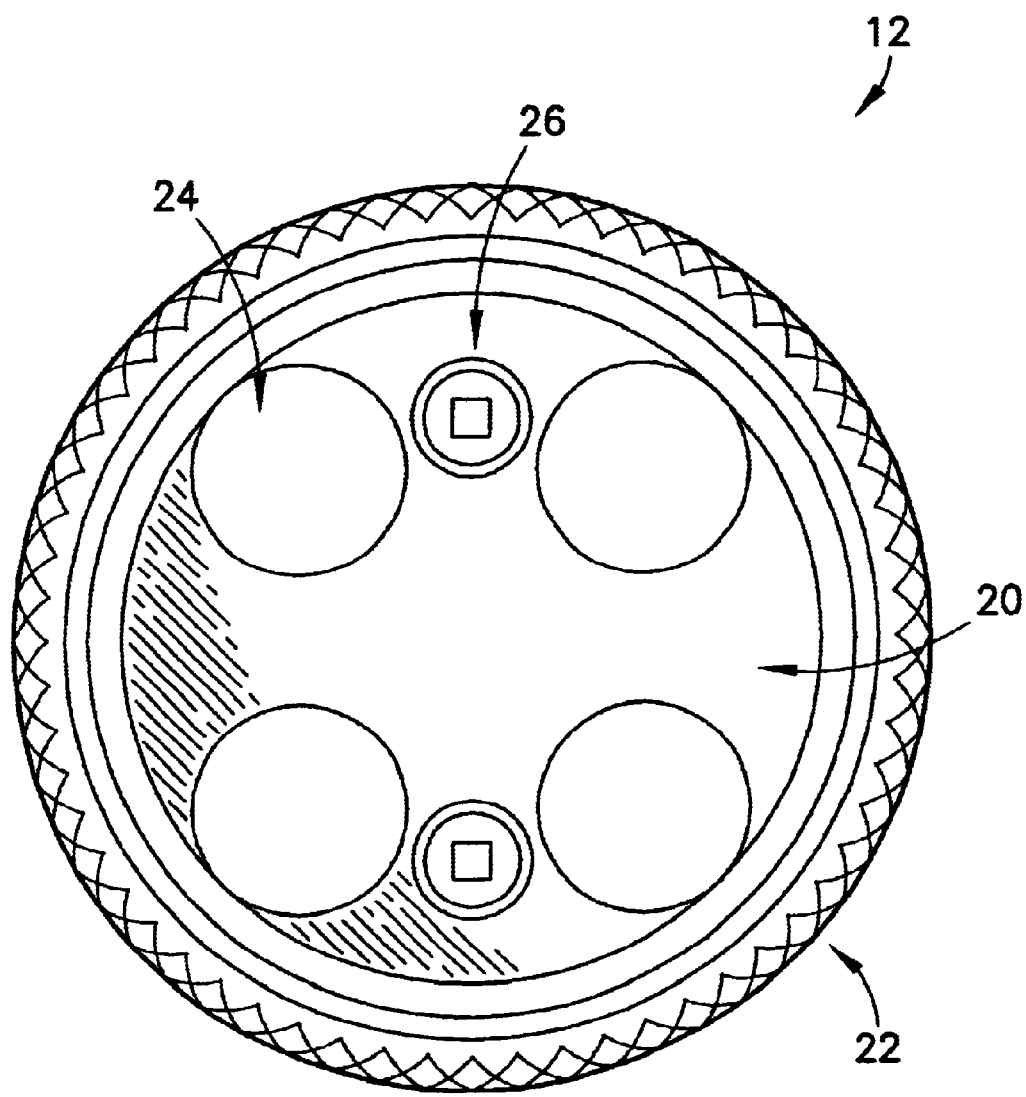
FIG. 3 is an elevation view of a wheel component of the device of FIG. 1.

Referring also to FIG. 3, each wheel 12 includes a center portion 20 and a circumferential portion 24. The center portions 20 provide structural support and stability to the wheels 12 and facilitate coupling the wheels 12 with the shafts 14. As illustrated, each center portion 20 is substantially circular, being approximately eight inches in diameter, and constructed primarily of a substantially inflexible and lightweight material such as, for example, nylon, aluminum, fiberglass, carbon fiber, or reinforced plastic. Each center portion 20 includes one or more relief holes 24 and one or more mounting holes 26. The relief holes 24 result from the removal of excess material from the center portion 20, which functions to reduce the device's total weight and thereby increase its hand-portability. The mounting holes 26 operate to receive the shafts 14, and are located approximately 1.5 inches from the outside edges of the center portions 20. The center wheel 12a includes two such mounting holes 26a, with each being identically offset to opposite sides of the wheels' common axis of rotation. The left and right side wheels 12b,12c each include at least one mounting hole 26b,26c, and each of these mounting holes 26b,26c aligns with a different one of the center wheel's mounting holes 26a. The mounting holes 26 may be provided with bearings 28, such as, for example roller bearings, for receiving the shafts 14 and for facilitating the turning thereof relative to the wheels 12 by reducing contact friction forces. These bearings 28 are preferably lightweight and substantially conventional in design and construction.

The circumferential portion 22 of each wheel 12 provides protection against wear and aids in absorbing impacts. As illustrated, the circumferential portion 22 is a substantially conventional solid or inflatable tire constructed of a deformable or otherwise flexible material such as polyurethane or reinforced rubber which is removable from the center portion 20 for repair or replacement. Alternatively, the circumferential portion 22 may, for example, be solid or hollow and constructed of substantially inflexible plastic or nylon which is permanently attached to the center portion 20. In either case, it is desirable that the circumferential portion 22 be non-marking and quiet, thereby making the device 10 even more suitable for indoor use.

The shafts 14 extend between and couple the wheels 12 and allow for transferring the rider-applied force from the pedals 16 to the wheels 12. As illustrated, there are preferably two substantially identical shafts 14, including a first shaft 14a, a second shaft 14b, though additional shafts may be added, such as, for example, where there are more than three wheels to allow for multiple simultaneous riders. The shafts 14 may be of any practical dimensions and constructed of any suitable material, such as for example, steel, potentially depending heavily on the size and weight of the rider to be supported. The ends of each shaft 14 are preferably adapted in a conventional manner for engaging or otherwise coupling with the mounting holes 26 in the wheels 12 or the bearings 28 provided in the mounting holes 26. When so coupled, the first shaft 14a will be parallel to and offset in a first direction from the wheels' axis of rotation, and the second shaft 14b will be parallel to and offset in a second direction from the wheels' axis of rotation, wherein the second direction is opposite the first.

The pedals 16 support the rider and are acted upon by the rider to cause the device 10 to move. As illustrated, there are preferably two pedals 16, including a first pedal 16a coupled with the first shaft 14a and a second pedal 16b coupled with the second shaft 14b. Each pedal 16 is substantially rectangular in shape and dimensioned to accommodate one of the rider's feet.

Each pedal 16 includes one or more non-slip contact surfaces 30 and one or more light reflectors 32. The non-slip contact surfaces 30 reduce or substantially 30 eliminate slippage of the rider's feet from the pedals 16. The non-slip contact surfaces 30 are preferably constructed of a material having a high coefficient of friction, such as, for example, rubber, and are provided on at least a top surface, and preferably on both the top and a bottom surface, of the pedals 16. The light reflectors 32 provide added safety during nighttime or other low-visibility riding by reflecting ambient light, such as, for example light from nearby streetlights or vehicle headlights. The light reflectors 32 are preferably constructed of a conventional reflective material and are provided on at least a back surface, and preferably on both the back and a front surface, of the pedals 16.

Thus, the rider stands on the pedals 16 and applies force thereto, with the force being transferred via the shafts 14 to the wheels 12 which are thereby caused to roll. It will be appreciated that a variety of coupling schemes for transferring this force are possible. In the scheme described above, for example, the pedals 16 are fixed relative to the shafts 16 and the shafts 14 freely rotate within the mounting holes 26 of the wheels 12. In an alternative scheme, the shafts 14 may be fixed relative to the wheels 12 and the pedals 16 may freely rotate upon the shafts 14. In yet another alternative scheme, the pedals 16 freely rotate upon the shafts 14 and the shafts 14 freely rotate within the mounting holes 26. In each of these schemes, the same effect is achieved.

In exemplary use and operation, the rider prepares the device 10 for riding by coupling the pedals 16 with the shafts 14, and coupling the shafts 14 with the wheels 12 using the mounting holes 36 or the bearings 38 in the mounting holes 36. It may also be necessary to inflate the circumferential tire portions 22 of the wheels 12. Preferably, however, the device 10 is provided to the rider in a fully assembled state and ready for use.

To ride the device 10, the rider places his or her left foot on the first pedal 16a and his or her right foot on the second pedal 16b so as to be standing upon and completely supported by the pedals 16. By applying force in a conventional pedaling manner to the pedals 16, the rider causes the wheels 12 to roll. Steering the device 10 may be accomplished by the rider leaning into the desired turning direction while moving. Slowing and stopping may be accomplished by lessening the applied force or by applying an opposing counterforce until the desired speed or stop is reached. As mentioned, the non-slip contact surfaces 30 of the pedals 16 substantially prevent the rider's feet from slipping off the pedals 16 during use, and the light reflectors 32 reflect ambient light to facilitate safer riding during darkness or under other low-visibility circumstances. Related to use, it will be appreciated that occasionally it may be necessary to reinflate, patch and reinflate, or replace the circumferential tire portion 22 of one or more of the wheels 12.

Figure 4:
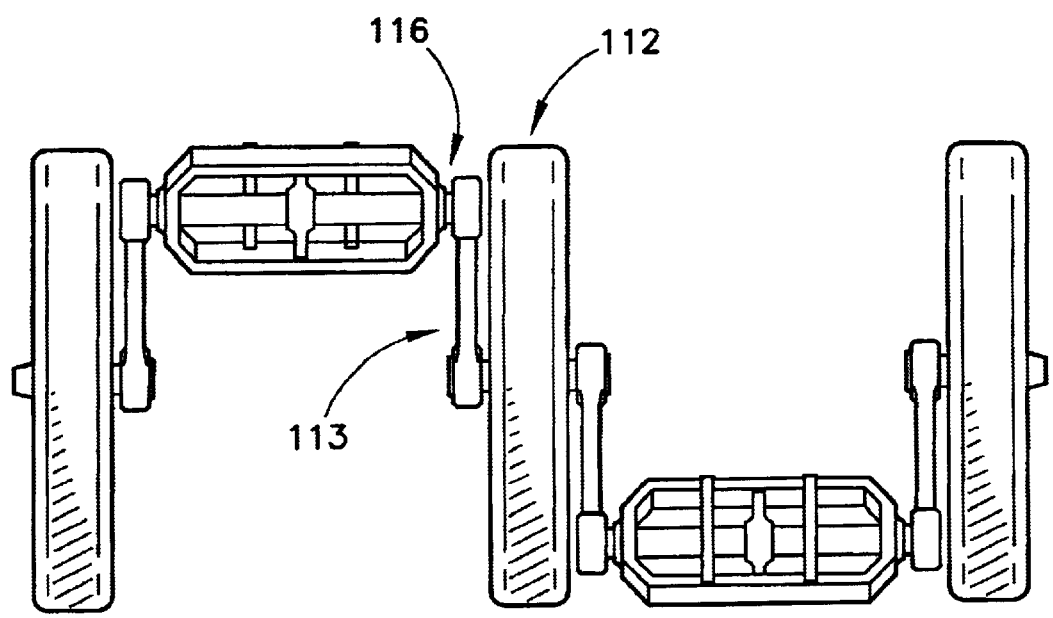
FIG. 4 is a front elevation view of a preferred second embodiment of the device of the present invention.

Referring also to FIG. 4, a preferred second embodiment of the device 110 is shown which is substantially similar to the above-described first embodiment. In the second embodiment, however, the shafts 114 are not coupled directly with the wheels 112. Instead, coupling arms 113 are included to couple each end of each shaft 114 with one of the wheels 112. Each coupling arm 113 presents a first end and a second end. The first end rotatably couples with the center of the wheel 12 at a point through which passes the wheels' common axis of rotation. The remainder of the coupling arm 113 projects away from the first end at an angle, such as, for example, 90°, relative to the wheels' common axis of rotation. The second end rotatably couples with an end of the shaft 16. Thus, there are two such coupling arms 113 associated with each shaft 114.

From the preceding description, it can be appreciated that the wheeled device of the present invention provides a number of significant advantages over the prior art, including, for example, that the device provides a substantial and enjoyable but not excessive riding challenge which requires and aids in developing motor skills such as balance and coordination. Furthermore, the device is advantageously suitable for indoor use, is conveniently hand-transportable, and is substantially less complex in construction and therefore less costly to manufacture. For these reasons, the device has application, for example, as a child's toy or a young adult's recreational vehicle wherein the child or young adult desires the challenge of mastering the device, or as part of a rehabilitation or therapy regimen for a disabled, injured, or otherwise handicapped person who wishes to develop or regain such the motor skills. Thus, the device incorporates features making it particularly suited for and user-friendly in a variety of applications.

Although the invention has been described with reference to the preferred embodiments illustrated in the attached drawings, it is noted that equivalents may be employed and substitutions made herein without departing from the scope of the invention as recited in the claims. Furthermore, applications and uses are contemplated for the device herein described that require only minor modifications to the device as disclosed. Thus, for example, rather than being limited to three wheels, the device may be provided with five wheels, four shafts, and four pedals so as to allow for accommodating two riders simultaneously.

Having thus described the preferred embodiment of the invention, what is claimed as new and desired to be protected by Letters Patent includes the following:

1. A device for supporting a rider and for moving in response to a force applied to the device by the rider, the device comprising:

a center wheel, a left wheel, and a right wheel, wherein the wheels are spaced apart from and oriented parallel to one another along a common axis of wheel rotation;

a first leftside coupling arm having a first end and a second end, with the first end of the first leftside coupling arm being rotatably coupled with a center portion of the center wheel, and the first leftside coupling arm projecting angularly therefrom in a first direction relative to the common axis of rotation;

a second leftside coupling arm having a first end and a second end, with the first end of the second leftside coupling arm being rotatably coupled with a center portion of the left wheel, and the second leftside arm projecting therefrom so as to be parallel to the first leftside coupling arm;

a first shaft extending between and rotatably coupled with the second ends of the first leftside coupling arm and the second leftside coupling arm so as to be parallel to and offset from the common axis of wheel rotation;

a first rightside coupling arm having a first end and a second end, with the first end of the first rightside coupling arm being rotatably coupled with a center portion of the center wheel, and the first rightside coupling arm projecting angularly therefrom in a second direction relative to the common axis of rotation, wherein the second direction is opposite the first direction;

a second rightside coupling arm having a first end and a second end, with the first end of the second rightside coupling arm being rotatably coupled with a center portion of the right wheel, and the second rightside arm projecting therefrom so as to be parallel to the first rightside coupling arm;

a second shaft extending between and rotatably coupled with the second ends of the first rightside coupling arm and the second rightside coupling arm so as to be parallel to and offset from the common axis of wheel rotation; and a first pedal and a second pedal, with the first pedal being associated with the first shaft and the second pedal being associated with the second shaft, wherein the rider may stand upon the first pedal and the second pedal and apply the force thereto, with the force being transferred via the shafts and the coupling arms to the wheels to move the device.

2. The device as set forth in claim 1, wherein the wheels are substantially identical in size and construction.

3. The device as set forth in claim 1, wherein each wheel includes a center portion providing substantially rigid structural support and a circumferential portion providing shock absorption.

4. The device as set forth in claim 3, wherein the center portion includes one or more relief holes resulting from removal of excess material.

5. The device as set forth in claim 1, wherein the first and second ends of the leftside coupling arms and the first and second ends of the rightside coupling arms are each provided with a friction-reducing bearing operable to facilitate rotational movement.

6. The device as set forth in claim 1, wherein each pedal includes a non-slip surface upon which the rider may stand, and a reflector surface operable to reflect light.

* * * * *